US012801165B2

(12) United States Patent
Tang et al.

(10) Patent No.: US 12,801,165 B2
(45) Date of Patent: Nov. 17, 2026

(54) TRAFFIC CONTROL SYSTEM FOR MINING TRUCKS AND METHOD FOR SAME

(71) Applicant: JIANGSU XCMG CONSTRUCTION MACHINERY RESEARCH INSTITUTE LTD., Xuzhou (CN)

(72) Inventors: Jianlin Tang, Xuzhou (CN); Jingwei Gao, Xuzhou (CN); Changcheng Zhou, Xuzhou (CN)

(73) Assignee: IANGSU XCMG CONSTRUCTION MACHINERY RESEARCH INSTITUTE LTD., Xuzhou (CN)

( * ) Notice: Subject to any disclaimer, the term of this patent is extended or adjusted under 35 U.S.C. 154(b) by 144 days.

(21) Appl. No.: 18/565,635

(22) PCT Filed: Jun. 11, 2021

(86) PCT No.: PCT/CN2021/099541
§ 371 (c)(1),
(2) Date: Nov. 30, 2023

(87) PCT Pub. No.: WO2022/077937
PCT Pub. Date: Apr. 21, 2022

(65) Prior Publication Data

US 2024/0370038 A1 Nov. 7, 2024

(30) Foreign Application Priority Data

Jun. 1, 2021 (CN) ........................ 202110608718.6

(51) Int. Cl.
*G05D 1/698* (2024.01)
*G05D 1/246* (2024.01)
(Continued)

(52) U.S. Cl.
CPC ........... *G05D 1/6987* (2024.01); *G05D 1/246* (2024.01); *G05D 1/693* (2024.01);
(Continued)

(58) Field of Classification Search
CPC ...... G05D 1/6987; G05D 1/246; G05D 1/693; G05D 2107/73; G05D 2105/28; G05D 2109/10; G05D 1/0214; G05D 1/0276
See application file for complete search history.

(56) References Cited

U.S. PATENT DOCUMENTS 10,145,241 B1 12/2018 Tessien
2011/0118900 A1 5/2011 Uchida et al.
(Continued)

FOREIGN PATENT DOCUMENTS

CN 102800202 A 11/2012
CN 106097776 A 11/2016
(Continued)

OTHER PUBLICATIONS

CN-112258877 Zhou original and machine translation (Year: 2021).*
(Continued)

*Primary Examiner* — Michael V Kerrigan
*Assistant Examiner* — Zachary E. F. Glade
(74) *Attorney, Agent, or Firm* — Myers Bigel, P.A.

(57) ABSTRACT

A traffic control system for a mining truck and a method thereof is provided. The traffic control system includes; a map management server, configured to draw a mine road into a mine map; a route planning server configured to plan a road node route according to the mine map, and plan a transition route when a mining truck switches lanes during a meeting process; and a traffic control server configured to store lane states of a plurality of lanes, arbitrate a travelling permission request of a mining truck according to a lane state of a lane where the mining truck is about to enter, approve the travelling permission request of the mining truck that meets a travelling condition, and dynamically update the lane states according to an arbitration result.

13 Claims, 6 Drawing Sheets

(51) Int. Cl.

| | |
|---|---|
| ***G05D 1/693*** | (2024.01) |
| ***G05D 105/28*** | (2024.01) |
| ***G05D 107/70*** | (2024.01) |
| ***G05D 109/10*** | (2024.01) |

(52) U.S. Cl.

CPC ..... *G05D 2105/28* (2024.01); *G05D 2107/73* (2024.01); *G05D 2109/10* (2024.01)

(56) References Cited

U.S. PATENT DOCUMENTS

| | | | |
|---|---|---|---|
| 2013/0226406 A1 | 8/2013 | Ueda et al. | |
| 2013/0338868 A1 | 12/2013 | Essame et al. | |
| 2018/0053406 A1 | 2/2018 | Kawamata et al. | |
| 2018/0068561 A1 | 3/2018 | Hamada et al. | |
| 2020/0233420 A1 | 7/2020 | Liu et al. | |
| 2021/0179134 A1* | 6/2021 | Zhu | B60W 60/0015 |

FOREIGN PATENT DOCUMENTS

| | | | | |
|---|---|---|---|---|
| CN | 106663369 A | 5/2017 | | |
| CN | 107251081 A | 10/2017 | | |
| CN | 107731010 A | 2/2018 | | |
| CN | 107963086 A | 4/2018 | | |
| CN | 108875998 A | 11/2018 | | |
| CN | 110415559 A | 11/2019 | | |
| CN | 111426330 A | 7/2020 | | |
| CN | 111429741 A | 7/2020 | | |
| CN | 111538323 A | 8/2020 | | |
| CN | 111683851 A | 9/2020 | | |
| CN | 111785039 A | 10/2020 | | |
| CN | 111897321 A | 11/2020 | | |
| CN | 112258877 A * | 1/2021 | | G08G 1/096833 |
| CN | 112530182 A | 3/2021 | | |
| KR | 20170011768 A | 2/2017 | | |

OTHER PUBLICATIONS

International Search Report and Written Opinion corresponding to PCT/CN2021/099541; Mailed Feb. 25, 2022 (13 pages, including English translation).

Lei, et al., "ConflictFinder: Mining Maritime Traffic Conflict from Massive Ship Trajectories", 18th IEEE International Conference on Mobile Data Management (MDM), Daejeon, Korea (South), 2017, 356-357.

Minghui, Mo, "Application of Multi-objective Traffic Assignment and Scheduling Algorithm for Driverless Truck in Open Pit Mine", Master's thesis of Xi'an University of Architecture and Technology. English abstract included, 2020, (78 pages).

* cited by examiner

TRAFFIC CONTROL SYSTEM FOR MINING TRUCKS AND METHOD FOR SAME

CROSS-REFERENCE TO RELATED APPLICATIONS

This application is a 35 U.S.C. § 371 national stage application of PCT International Application No. PCT/CN2021/099541, filed Jun. 11, 2021, which claims priority to China Patent Application No. 202110608718.9, filed Jun. 1, 2021, the disclosures of which are incorporated by reference herein in their entirety.

TECHNICAL FIELD

The present disclosure relates to a traffic control system for a mining truck and a method thereof.

BACKGROUND

Normally, the surface mines are located in remote areas and harsh environments. The aging trend of the drivers in operation of the transport vehicles in mining areas become apparent, and the safety accidents resulting from the negligence of the transport drivers occur frequently. In the future, the mining areas are subjected to increasing economic burdens in aspects such as production safety and labor investment. With the urgent needs of the mining areas and the promotion of the development of modern science and technology, the unmanned transport solution for the surface mines is gradually developed.

SUMMARY

According to one aspect of the present disclosure, a traffic control system for a mining truck is provided. The traffic control system comprises: a map management server configured to draw a mine road into a mine map, wherein the mine map comprises a plurality of lanes and a plurality of road nodes connected to the plurality of lanes, the plurality of lanes comprising a dual lane and a single lane, and the dual lane comprising a trunk lane and an auxiliary lane on both sides of the trunk lane, wherein the trunk lane is connected to the single lane; a route planning server configured to obtain the mine map from the map management server, plan a road node route according to the mine map, and plan a transition route when the mining truck switches lanes during a meeting process; and a traffic control server configured to store lane states of the plurality of lanes in the mine map, arbitrate a travelling permission request of the mining truck according to a lane state of a lane where the mining truck is about to enter, approve the travelling permission request of the mining truck that meets a travelling condition, and dynamically update the lane states according to an arbitration result, wherein the lane states comprise an occupied state and an idle state.

In some embodiments, the map management server is configured to, for a first road section where a width of the mine road satisfies a condition for two mining trucks to meet, draw a midline area of the mine road into the trunk lane and draw a first auxiliary lane and a second auxiliary lane on both sides of the trunk lane by a map drawing tool, and set, for a second road section where the width of the mine road does not satisfy the condition for two mining trucks to meet, the second road section as the single lane.

In some embodiments, the route planning server is configured to, according to a current position of a first mining truck and a current position of a second mining truck traveling opposite to the first mining truck, plan a first travel trajectory for the first mining truck and plan a second travel trajectory for the second mining truck by using the mine map, and send the first travel trajectory to the first mining truck and send the second travel trajectory to the second mining truck, to cause the first mining truck and the second mining truck to perform meeting; and the traffic control server is configured to determine whether to approve the travelling permission request from the first mining truck to enter a next lane according to the lane state of the next lane where the first mining truck is about to enter and a first distance between the first mining truck and the second mining truck, approve the travelling permission request of the first mining truck to enter the next lane in a case where the lane state of the next lane is the idle state or in a case where the lane state of the next lane is the occupied state and the first distance is greater than a safety threshold, and refuse the travelling permission request of the first mining truck to enter the next lane and send a deceleration command or a stopping command to the first mining truck and the second mining truck in a case where the lane state of the next lane is the occupied state and the first distance is less than or equal to the safety threshold.

In some embodiments, the traffic control server is further configured to determine whether to approve the travelling permission request of the first mining truck to enter the auxiliary lane of the first road section according to the lane state of the auxiliary lane of the first road section after receiving the travelling permission request from the first mining truck to enter the auxiliary lane of the first road section, refuse the travelling permission request of the first mining truck to enter the auxiliary lane of the first road section and command the first mining truck to stop and wait in a case where the lane state of the auxiliary lane of the first road section is the occupied state, and approve the travelling permission request of the first mining truck to enter the auxiliary lane of the first road section in a case where the lane state of the auxiliary lane of the first road section is the idle state.

In some embodiments, the route planning server is further configured to, in a case where the traffic control server approves the travelling permission request of the first mining truck to enter the auxiliary lane of the first road section, plan a first transition route from the trunk lane of the first road section to the first auxiliary lane for the first mining truck, plan a second transition route from the trunk lane of the first road section to the second auxiliary lane for the second mining truck, and after the first mining truck and the second mining truck perform the meeting, plan a third transition route from the first auxiliary lane to the trunk lane for the first mining truck and plan a fourth transition route from the second auxiliary lane to the trunk lane for the second mining truck.

In some embodiments, the traffic control server is further configured to, after the first mining truck enters the first auxiliary lane from the trunk lane according to the first transition route and the second mining truck enters the second auxiliary lane from the trunk lane according to the second transition route, if there is a third mining truck traveling opposite to the second mining truck and a second distance between the third mining truck and the second mining truck is less than or equal to the safety threshold, send a command to the second mining truck to stop and wait on the second auxiliary lane, and approve the travelling permission request from the third mining truck to enter the first auxiliary lane; and the route planning server is further configured to plan a fifth transition route from the trunk lane to the first auxiliary lane for the third mining truck, and plan a sixth transition route from the first auxiliary lane to the trunk lane for the third mining truck after the third mining truck and the second mining truck perform the meeting.

In some embodiments, the traffic control server is further configured to approve the travelling permission request from the first mining truck to enter the single lane if there are no other mining trucks traveling on the single lane in a case where the first mining truck travels on a first trunk lane adjacent to the single lane.

In some embodiments, the traffic control server is further configured to refuse the travelling permission request from the first mining truck to enter the single lane if the second mining truck travels on the single lane and the second mining truck travels opposite to the first mining truck, and approve the travelling permission request from the second mining truck to enter the second auxiliary lane in a case where the second mining truck travels to the first trunk lane, and approve the travelling permission request from the first mining truck to enter the single lane after the second mining truck leaves the second auxiliary lane and travels to the trunk lane; and the route planning server is further configured to plan a seventh transition route from the first trunk lane to the first auxiliary lane for the first mining truck after the traffic control server refuses the travelling permission request from the first mining truck to enter the single lane, and plan an eighth transition route from the first trunk lane to the second auxiliary lane for the second mining truck after the traffic control server approves the travelling permission request from the second mining truck to enter the second auxiliary lane.

According to another aspect of the present disclosure, a traffic control method for a mining truck is provided. The traffic control method comprises: drawing a mine road into a mine map, wherein the mine map comprises a plurality of lanes and a plurality of road nodes connected to the plurality of lanes, the plurality of lanes comprising a dual lane and a single lane, and the dual lane comprising a trunk lane and an auxiliary lane on both sides of the trunk lane, wherein the trunk lane is connected to the single lane; planning a road node route according to the mine map, and planning a transition route when the mining truck switches lanes during a meeting process; and arbitrating a travelling permission request of the mining truck according to a lane state of a lane where the mining truck is about to enter, approving the travelling permission request of the mining truck that meets a travelling condition, and dynamically updating the lane states according to an arbitration result, wherein the lane states comprise an occupied state and an idle state.

In some embodiments, the drawing of the mine road into the mine map comprises: for a first road section where a width of the mine road satisfies a condition for two mining trucks to meet, drawing a midline area of the mine road into the trunk lane and drawing a first auxiliary lane and a second auxiliary lane on both sides of the trunk lane by a map drawing tool, and setting, for a second road section where the width of the mine road does not satisfy the condition for two mining trucks to meet, the second road section as the single lane.

In some embodiments, the traffic control method further comprises: determining whether to approve the travelling permission request from a first mining truck to enter a next lane according to the lane state of the next lane where the first mining truck is about to enter and a first distance between the first mining truck and a second mining truck, wherein the second mining truck travels opposite to the first mining truck, approving the travelling permission request of the first mining truck to enter the next lane in a case where the lane state of the next lane is the idle state or in a case where the lane state of the next lane is the occupied state and the first distance is greater than a safety threshold, and refusing the travelling permission request of the first mining truck to enter the next lane and sending a deceleration command or a stopping command to the first mining truck and the second mining truck in a case where the lane state of the next lane is the occupied state and the first distance is less than or equal to the safety threshold; and according to a current position of the first mining truck and a current position of the second mining truck, planning a first travel trajectory for the first mining truck and planning a second travel trajectory for the second mining truck by using the mine map, and sending the first travel trajectory to the first mining truck and sending the second travel trajectory to the second mining truck, to cause the first mining truck and the second mining truck to perform meeting.

In some embodiments, the traffic control method further comprises: determining whether to approve the travelling permission request of the first mining truck to enter the auxiliary lane of the first road section according to the lane state of the auxiliary lane of the first road section after receiving the travelling permission request from the first mining truck to enter the auxiliary lane of the first road section; refusing the travelling permission request of the first mining truck to enter the auxiliary lane of the first road section and commanding the first mining truck to stop and wait in a case where the lane state of the auxiliary lane of the first road section is the occupied state; and approving the travelling permission request of the first mining truck to enter the auxiliary lane of the first road section in a case where the lane state of the auxiliary lane of the first road section is the idle state, planning a first transition route from the trunk lane of the first road section to the first auxiliary lane for the first mining truck, planning a second transition route from the trunk lane of the first road section to the second auxiliary lane for the second mining truck, and after the first mining truck and the second mining truck perform the meeting, planning a third transition route from the first auxiliary lane to the trunk lane for the first mining truck and planning a fourth transition route from the second auxiliary lane to the trunk lane for the second mining truck.

In some embodiments, the traffic control method further comprises: after the first mining truck enters the first auxiliary lane from the trunk lane according to the first transition route and the second mining truck enters the second auxiliary lane from the trunk lane according to the second transition route, if there is a third mining truck traveling opposite to the second mining truck and a second distance between the third mining truck and the second mining truck is less than or equal to the safety threshold, sending a command to the second mining truck to stop and wait on the second auxiliary lane, and approving the travelling permission request from the third mining truck to enter the first auxiliary lane, planning a fifth transition route from the trunk lane to the first auxiliary lane for the third mining truck, and planning a sixth transition route from the first auxiliary lane to the trunk lane for the third mining truck after the third mining truck and the second mining truck perform the meeting.

In some embodiments, the traffic control method further comprises: approving the travelling permission request from a first mining truck to enter the single lane if there are no other mining trucks traveling on the single lane in a case where the first mining truck travels on a first trunk lane adjacent to the single lane.

In some embodiments, the traffic control method further comprises: if a second mining truck travels on the single lane and the second mining truck travels opposite to the first mining truck, refusing the travelling permission request from the first mining truck to enter the single lane, and planning a seventh transition route from the first trunk lane to a first auxiliary lane for the first mining truck; in a case where the second mining truck travels to the first trunk lane, approving the travelling permission request from the second mining truck to enter a second auxiliary lane, and planning an eighth transition route from the first trunk lane to the second auxiliary lane for the second mining truck; and approving the travelling permission request from the first mining truck to enter the single lane after the second mining truck leaves the second auxiliary lane and travels to the trunk lane.

According to another aspect of the present disclosure, a traffic control system for a mining truck is provided. The traffic control system comprises: a memory; and a processor coupled to the memory, wherein the processor is configured to perform the method described previously based on instructions stored in the memory.

According to another aspect of the present disclosure, a non-transitory computer-readable storage medium having stored thereon computer program instructions that, when executed by a processor, implement the method described previously is provided.

Other features and advantages of the present disclosure will become apparent from the following detailed description of exemplary embodiments of the present disclosure with reference to the accompanying drawings.

BRIEF DESCRIPTION OF THE ACCOMPANYING DRAWINGS

The accompanying drawings which constitute a part of this specification, illustrate the embodiments of the present disclosure, and together with this specification, serve to explain the principles of the present disclosure.

The present disclosure may be more explicitly understood from the following detailed description with reference to the accompanying drawings, in which.

DETAILED DESCRIPTION

Various exemplary embodiments of the present disclosure will now be described in detail with reference to the accompanying drawings. It should be noted that: unless additionally specified, the relative arrangements, numerical expressions and numerical values of the components and steps expounded in these examples do not limit the scope of the present disclosure.

At the same time, it should be understood that, for ease of description, the dimensions of various parts shown in the accompanying drawings are not drawn according to actual proportional relations.

The following descriptions of at least one exemplary embodiment which are in fact merely illustrative, shall by no means serve as any delimitation on the present disclosure as well as its application or use.

The techniques, methods, and devices known to a common technical person in the relevant art may not be discussed in detail, but where appropriate, the techniques, methods, and devices should be considered as part of the description.

Among all the examples shown and discussed here, any specific value shall be construed as being merely exemplary, rather than as being restrictive. Thus, other examples in the exemplary embodiments may have different values.

It is to be noted that: similar reference signs and letters present similar items in the following accompanying drawings, and therefore, once an item is defined in one accompanying drawing, it does not need to be discussed further in the subsequent accompanying drawings.

In the related art, since the operation management of the surface mines presents particularity and complexity, the implementation of the unmanned transport system for the surface mines is confronted with several technical challenges. Actually, the traffic roads in the mines are likely have turns, with continuously narrow road sections. If a dual lane is planned, the lane line is close to the edge of the road and the safety distance is not enough so that it is impossible to ensure safety traffic of the vehicles at a high speed. Even worse, the standard dual lane cannot be planned in some road sections, so that there is a poor efficiency of the meeting process, and the average speed of the vehicles traveling on the road may also be affected, thereby resulting in a low transport efficiency of the system.

In view of this, the present disclosure provides a traffic control system or method for a mining truck to improve the efficiency of meeting of a mining truck on a mining road.

Figure 1:
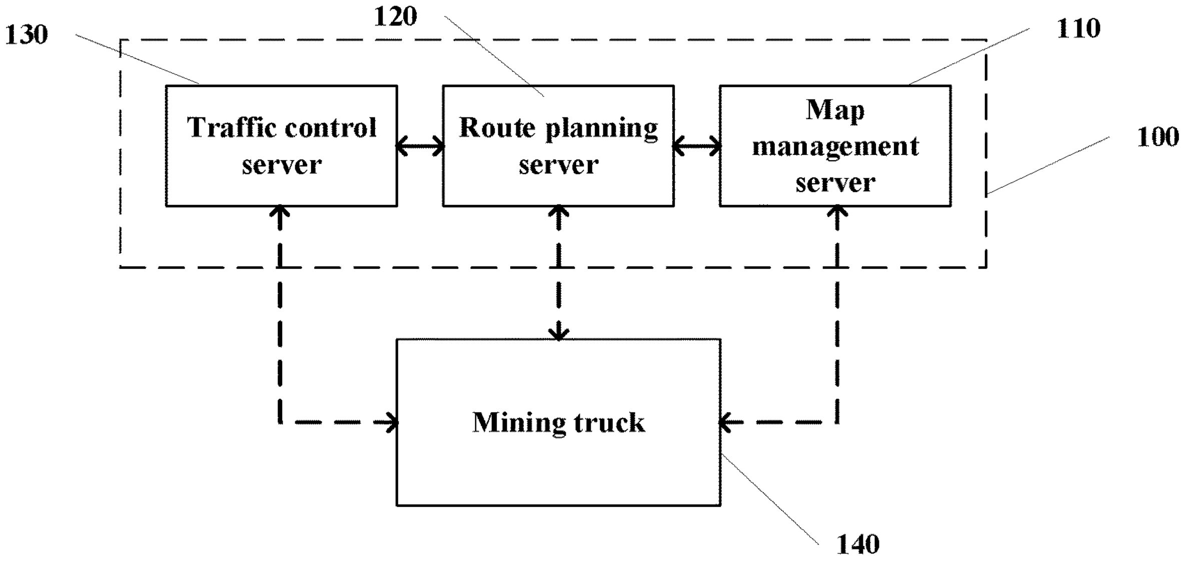
FIG. 1 is a structural schematic view showing a traffic control system for a mining truck according to some embodiments of the present disclosure.
Figure 2:
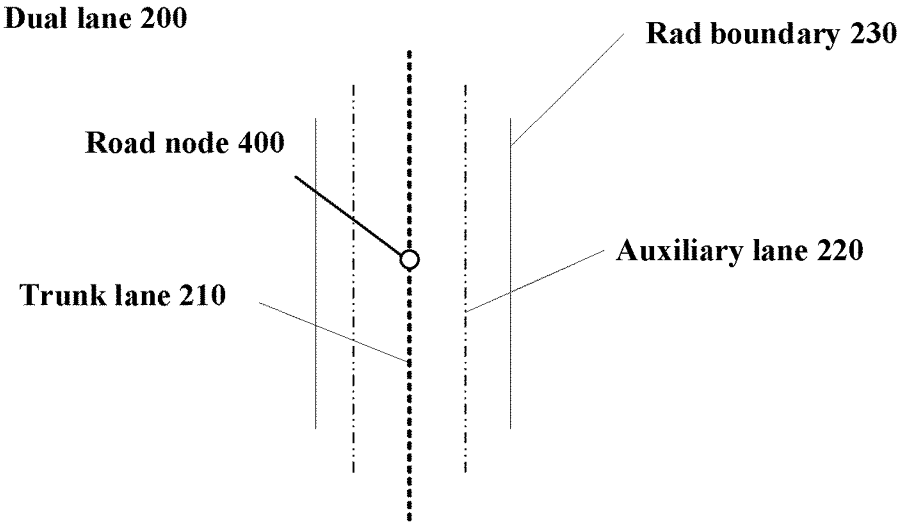
FIG. 2 is a schematic view showing a dual lane according to some embodiments of the present disclosure.
Figure 3:
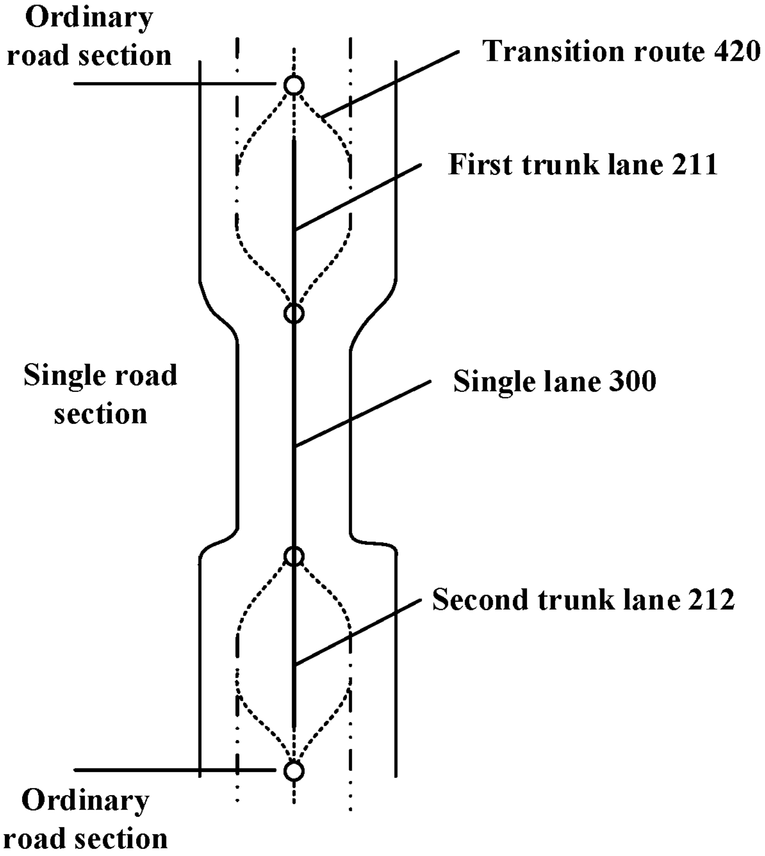
FIG. 3 is a schematic view showing a single lane according to some embodiments of the present disclosure.

FIG. 1 is a structural schematic view showing a traffic control system for a mining truck according to some embodiments of the present disclosure. FIG. 2 is a schematic view showing a dual lane according to some embodiments of the present disclosure. FIG. 3 is a schematic view showing a single lane according to some embodiments of the present disclosure.

As shown in FIG. 1, the traffic control system 100 comprises a map management server 110, a route planning server 120 and a traffic control server 130. The map management server 110, the route planning server 120 and the traffic control server 130 are electrically connected to each other. For example, these servers may be communicatively connected by wired connection. For example, the map management server 110, the route planning server 120, and the traffic control server 130 may all be installed within a fixed machine room. In addition, a mining truck 140 is also shown in FIG. 1. Each of the above-described servers may communicate with the mining truck through the communication network. The communication network may use one or more of WIFI, 4G or 5G. Each of the above-described servers may be connected to the mining truck by a wireless connection. In other embodiments, the map management server 110, the route planning server 120, and the traffic control server 130 may be integrated together.

The map management server 110 is configured to draw a mine road into a mine map. The mine map comprises a plurality of lanes and a plurality of road nodes (for example, a road node 400 shown in FIG. 2) connected to the plurality of lanes. The plurality of lanes comprise a dual lane 200 (as shown in FIG. 2) and a single lane 300 (as shown in FIG. 3). As shown in FIG. 2, the dual lane 200 comprises a trunk lane 210 and an auxiliary lane 220 on both sides of the trunk lane 210. The trunk lane 210 is connected with the one-way road 300. Here, the dual lane refers to a lane that can satisfy that two vehicles travel in parallel (for example, meeting) (for example, a midline area of the road that may be multiplex for a round trip may serve as a trunk lane), and the single lane refers to a lane that can only satisfy that one vehicle passes alone.

For example, auxiliary lanes may be provided on both sides of the trunk lane of a road section where the meeting is possible (for example, a width of the road is greater than or equal to 3 times the width of the vehicle), and a distance between the lines of two auxiliary lanes may be several meters (for example, 3 meters) greater than the width of the vehicle. For another example, a distance between the line of the auxiliary lane and a road boundary is greater than or equal to 0.5 times the width of the vehicle.

It should be noted that, the trunk lane 210 and the auxiliary lane 220 shown in FIG. 2 are both belt-shaped. For example, a belt-shaped area of the trunk lane 210 may partially overlap with a belt-shaped area of the auxiliary lane 220, that is, a part of the trunk lane 210 overlaps with a part of the auxiliary lane 220. As shown in FIG. 2, one auxiliary lane 220 is provided on both sides of the trunk lane 210 respectively.

In some embodiments, for a dual lane, it is necessary to make a center distance of two auxiliary lane meet the requirements for the meeting between two vehicles, and a distance between the auxiliary lane and the road boundary 230 located on the same side satisfies a requirement for a safe distance of traveling vehicles.

As shown in FIG. 3, on a one-way road section, there are a single lane 300 as well as a first trunk lane 211 and a second trunk lane 212 connected to the single lane 300 respectively. There are auxiliary lanes on both sides of the first trunk lane 211, and there are also auxiliary lanes on both sides of the second trunk lane 212. FIG. 3 also shows a transition route 420 from the auxiliary lane to the trunk lane or from the trunk lane to the auxiliary lane.

For example, the trunk lane section of the road section where the meeting is impossible (for example, the width of the road is less than 3 times the width of the vehicle) is provided to be a single lane. The single lane is not provided with a transition route.

In some embodiments, the map management server 110 is configured to, for a first road section where a width of the mine road satisfies a condition for two mining trucks to meet (for example, the two-way road section shown in FIG. 2), draw a midline area of the mine road into the trunk lane and draw a first auxiliary lane and a second auxiliary lane on both sides of the trunk lane by a map drawing tool, and set, for a second road section where the width of the mine road does not satisfy the condition for two mining trucks to meet (for example, the one-way road section shown in FIG. 3), the second road section as the single lane.

It should be noted here that, the midline area mentioned above refers to a belt-shaped area extends to both sides with a predetermined width with the midline of the mine road as the midline of the area.

In some embodiments, the map management server 110 is further configured to draw a transition route at a junction of the single lane and the dual lane, wherein the transition route is a route connecting the auxiliary lane with the trunk lane.

The route planning server 120 is configured to obtain the mine map from the map management server 110, plan a road node route according to the mine map, and plan a transition route when the mining truck switches lanes during a meeting process.

In some embodiments, the route planning server 120 is configured to, according to a current position of a first mining truck and a current position of a second mining truck traveling opposite to the first mining truck, plan a first travel trajectory for the first mining truck and plan a second travel trajectory for the second mining truck by using the mine map, and send the first travel trajectory to the first mining truck and send the second travel trajectory to the second mining truck, to cause the first mining truck and the second mining truck to perform meeting. That is, the first mining truck travels according to the first travel trajectory and the second mining truck travels according to the second travel trajectory, thereby realizing the truck meeting between the mining trucks. For example, the travel trajectories (the first travel trajectory and the second travel trajectory) described here may comprise a transition route from the trunk lane to the auxiliary lane or a transition route from the auxiliary lane to the trunk lane.

The route planning server 120 may plan a trunk lane trajectory from the current position of the mining truck to a destination for the mining truck, and then plan a required lane-shifting transition route for the mining truck during the meeting process with other vehicles during the travel process to satisfy the demand of the meeting process.

The traffic control server 130 is configured to store lane states of the plurality of lanes in the mine map, arbitrate a travelling permission request of the mining truck according to a lane state of a lane where the mining truck is about to enter, approve the travelling permission request of the mining truck that meets a travelling condition, and dynamically update the lane states according to an arbitration result. Here, a corresponding lane means a lane where the mining truck is about to enter.

The lane states comprise an occupied state and an idle state. Here, the idle state means that there is no vehicle traveling in the lane, and the occupied state means that there is a vehicle traveling in the lane. For example, the first mining truck travels on a certain section of the trunk lane in the road section where the meeting is possible, and the traffic control server sets the state of the section of the trunk lane as an occupied state, and marks the lane occupant as the first mining truck; otherwise, as an idle state. If the first mining truck travels on the road section shown in FIG. 3, the first trunk lane 211, the single lane 300, the second trunk lane 212, and the transition route in the same direction may all be set to be an occupied state. When the first mining truck stops and waits on the auxiliary lane corresponding to the first trunk lane 211, the first trunk lane 211 is set to be an occupied state, and the second mining truck traveling opposite to the first mining truck has no travel permission on the first trunk lane 211. The second mining truck travels from another auxiliary lane (to be described in detail later).

In some embodiments, the traffic control server 130 is configured to determine whether to approve the travelling permission request from the first mining truck to enter a next lane according to the lane state of the next lane where the first mining truck is about to enter (i.e., a next lane of a lane where the first mining truck is currently located) and a first distance between the first mining truck and the second mining truck, approve the travelling permission request of the first mining truck to enter the next lane in a case where the lane state of the next lane is the idle state or in a case where the lane state of the next lane is the occupied state and the first distance is greater than a safety threshold, and refuse the travelling permission request of the first mining truck to enter the next lane and send a deceleration command or a stopping command to the first mining truck and the second mining truck in a case where the lane state of the next lane is the occupied state and the first distance is less than or equal to the safety threshold.

The above-described safety threshold may be determined according to actual conditions or actual needs. For example, the safety threshold may range from 10 meters to 200 meters. Of course, it may be appreciated by those skilled in the art that the scope of the safety threshold is only exemplary, and the scope of the present disclosure is not only limited to the scope of the safety threshold described here. For example, the safety threshold may be less than 10 meters or more than 200 meters.

In the above-described embodiment, after receiving the travelling permission request (or referred to as a travelling permission request message) from the first mining truck to enter a certain lane, the traffic control server 130 approves the travelling permission request of the first mining truck, that is, the first mining truck is allowed to enter the lane, if the lane state of the lane is an idle state or the first distance is greater than the safety threshold although the lane state of the lane is an occupied state; and refuses the travelling permission request of the first mining truck, that is, the first mining truck is not allowed to enter the lane, if the lane state of the lane is an occupied state (that is, the lane has been occupied by another mining truck) and the first distance is less than or equal to the safety threshold. In this way, it is possible to improve the safety of the mining truck on the lane.

In some embodiments, the traffic control server 130 may set the safety thresholds for two trucks traveling in the same direction and in opposite directions. When the two trucks travel in the same direction and the distance between the two trucks is less than the safety threshold, a rear vehicle will slow down or stop. When the two trucks travel in opposite directions and the distance between the two trucks is less than the safety threshold, the two trucks may stop or slow down, and proceed with a flow of the meeting process.

So far, a traffic control system for a mining truck according to some embodiments of the present disclosure is provided. The traffic control system comprises: a map management server configured to draw a mine road into a mine map, wherein the mine map comprises a plurality of lanes and a plurality of road nodes connected to the plurality of lanes, the plurality of lanes comprising a dual lane and a single lane, and the dual lane comprising a trunk lane and an auxiliary lane on both sides of the trunk lane, wherein the trunk lane is connected to the single lane; a route planning server configured to obtain the mine map from the map management server, plan a road node route according to the mine map, and plan a transition route when the mining truck switches lanes during a meeting process; and a traffic control server configured to store lane states of the plurality of lanes in the mine map, arbitrate a travelling permission request of the mining truck according to a lane state of a lane where the mining truck is about to enter, approve the travelling permission request of the mining truck that meets a travelling condition, and dynamically update the lane states according to an arbitration result, wherein the lane states comprise an occupied state and an idle state. The system may improve the efficiency of the meeting between the mining trucks on the mine road, thereby increasing an average speed of the vehicle on the road, and further improving the transport efficiency of the system.

In the above description, the traffic control system comprises the map management server, the route planning server and the traffic control server, but does not comprise the mining truck 140. However, the scope of the present disclosure is not limited to this. For example, the traffic control system may also comprise the mining truck 140.

In some embodiments, the mining truck 140 described above is an unmanned mining truck. For example, the mining truck may comprise a positioning device and an autonomous driving system. The positioning device and the autonomous driving system are installed on the mining truck. The positioning device is configured to obtain own position information and send the position information to the traffic control server 130 and the route planning server 120. In addition, the positioning device may also send a travel direction and travel speed information of the mining truck to the traffic control server 130 and the route planning server 120. The autonomous driving system is configured to receive a deceleration command or a stopping command from the traffic control server 130 and automatically perform a deceleration or stopping operation, and to receive a travel trajectory from the route planning server 120 and perform automatic travel according to the travel trajectory (for example, a transition route). The autonomous driving system may also send a travelling permission request message to the traffic control server, the travelling permission request message being configured to request to enter a certain lane.

The travelling condition of the mining truck in different situations will be described respectively in conjunction with FIGS. 4 to 8.

Figure 4:
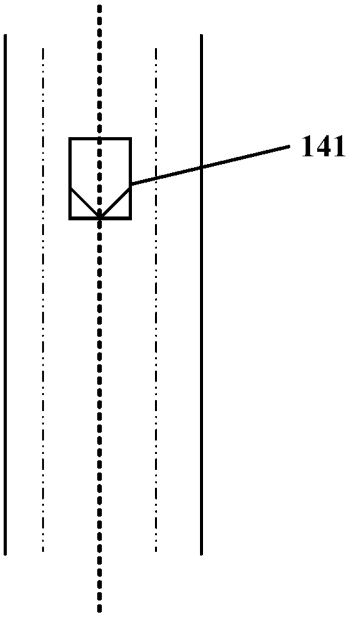
FIG. 4 is a schematic view showing a mining truck traveling on a mine road according to some embodiments of the present disclosure.

FIG. 4 is a schematic view showing a mining truck traveling on a mine road according to some embodiments of the present disclosure. FIG. 4 shows a schematic view of normal travel of a mining truck on a mine road section where the meeting is possible. An arrow in the truck shown in FIG. 4 indicates a travel direction of the truck, which is similar below.

As shown in FIG. 4, when there is only the first mining truck on the trunk lane of the certain section, the first mining truck 141 travels normally on the trunk lane of the road section.

For example, each time when traveling to the middle of a section of a lane, the first mining truck 141 requests the traffic control server whether it is possible to travel on the next lane, and the traffic control server may determine whether to approve the travelling permission request of the first mining truck 141 to enter the next lane according to the lane state of the next lane. If the state of the next lane is an idle state, the traffic control server approves the travelling permission request of the first mining truck 141, and the first mining truck 141 continues to travel. If the state of the next lane is an occupied state, that is, there is a second mining truck (to be described in detail below in conjunction with FIG. 5) traveling in the opposite direction, the traffic control server will refuse the request of the first mining truck 141, and the first mining truck 141 may slow down after the travelling permission request of the next lane is refused.

Figure 5:
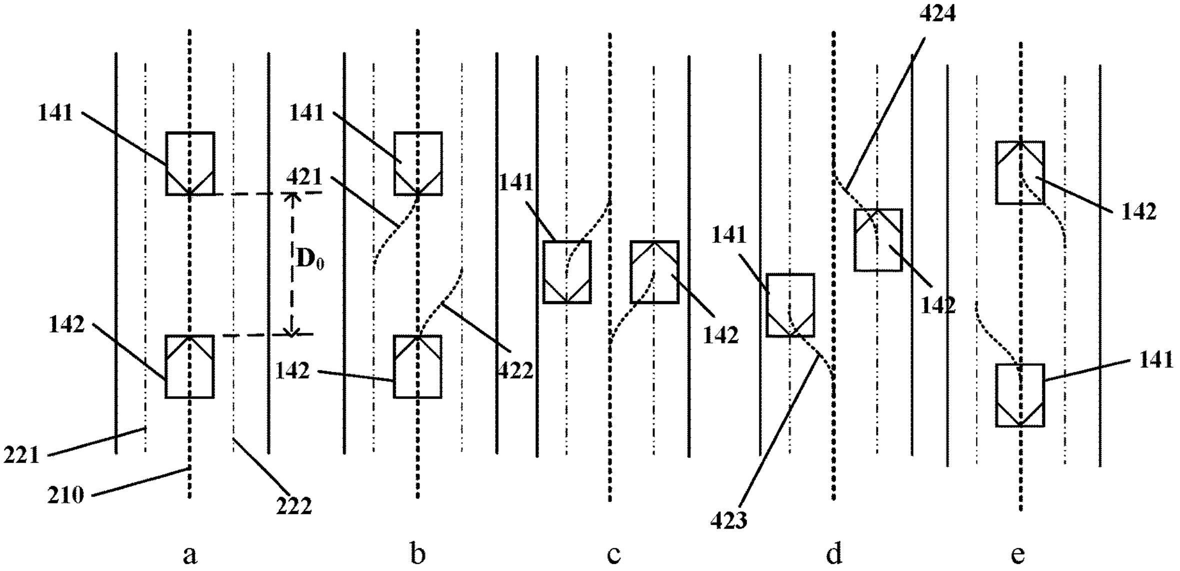
FIG. 5 is a schematic view showing a mining truck traveling on a mine road according to other embodiments of the present disclosure.

FIG. 5 is a schematic view showing a mining truck traveling on a mine road according to other embodiments of the present disclosure. FIG. 5 shows a schematic view of the meeting process of two mining trucks on a road section where the meeting is possible.

As shown in FIG. 5, when the first mining truck 141 meets the second mining truck 142, and the two trucks 141 and 142 reach the safety threshold Do, the traffic control server 130 may send a deceleration command or a stopping command to the two trucks (as shown in Fig. a of FIG. 5).

The first mining truck 141 sends a travelling permission request to the traffic control server, the travelling permission request being configured to request to enter the auxiliary lane (for example, the first auxiliary lane 221), and the traffic control server determines whether to approve the travelling permission request according to whether a corresponding auxiliary lane is in an idle state. If the auxiliary lane is in an occupied state, the traffic control server refuses the request of the first mining truck 141, and the first mining truck 141 stops to wait, and continuously sends the travelling permission request for the auxiliary lane. If the corresponding auxiliary lane is in an idle state, the traffic control server approves the request of the first mining truck 141, and the route planning server plans a first transition route 421 from the trunk lane to the auxiliary lane (for example, the first auxiliary lane 221) for the first mining truck 141, and sends the first transition route to the first mining truck 141. The first mining truck 141 enters the auxiliary lane according to the first transition route 421. The second mining truck 142 traveling in the opposite direction executes the same instruction as the above-described instruction of the first mining truck 141. After reaching the auxiliary lane, both vehicles travel slowly along the auxiliary lanes until the meeting process ends.

The two trucks then apply to the traffic control server for a request from the auxiliary lane to the trunk lane. After the request is approved, the route planning server will plan the transition routes from the auxiliary lanes to the trunk lane for the two trucks (as shown Fig. d of FIG. 5). According to the transition routes, the two trucks enter the trunk lane from the auxiliary lanes and travel at a high speed (as shown Fig. e of FIG. 5).

In the above embodiment, the traffic control server 130 may also be configured to determine whether to approve the travelling permission request of the first mining truck 141 to enter the auxiliary lane of the first road section according to the lane state of the auxiliary lane of the first road section after receiving the travelling permission request from the first mining truck 141 to enter the auxiliary lane of the first road section, refuse the travelling permission request of the first mining truck 141 to enter the auxiliary lane of the first road section and command the first mining truck 141 to stop and wait in a case where the lane state of the auxiliary lane of the first road section is the occupied state, and approve the travelling permission request of the first mining truck 141 to enter the auxiliary lane of the first road section in a case where the lane state of the auxiliary lane of the first road section is the idle state.

The route planning server 120 may further be configured to, in a case where the traffic control server 130 approves the travelling permission request of the first mining truck 141 to enter the auxiliary lane of the first road section, plan a first transition route 421 from the trunk lane 210 of the first road section to the first auxiliary lane 221 for the first mining truck 141, plan a second transition route 422 from the trunk lane 210 of the first road section to the second auxiliary lane 222 for the second mining truck 142, and after the first mining truck 141 and the second mining truck 142 perform the meeting, plan a third transition route 423 from the first auxiliary lane 221 to the trunk lane 210 for the first mining truck 141 and plan a fourth transition route 424 from the second auxiliary lane 222 to the trunk lane 210 for the second mining truck 142.

In this embodiment, the meeting operation of the first mining truck and the second mining truck on the dual lane is achieved, so that the efficiency of the meeting between the two trucks can be improved.

Figure 6:
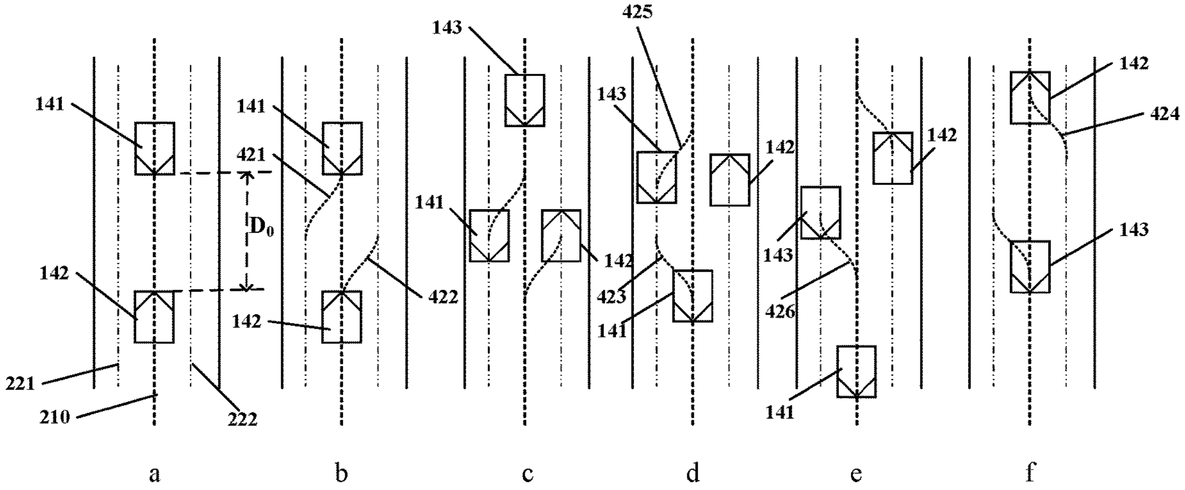
FIG. 6 is a schematic view showing a mining truck traveling on a mine road according to other embodiments of the present disclosure.

FIG. 6 is a schematic view showing a mining truck traveling on a mine road according to other embodiments of the present disclosure. FIG. 6 shows a schematic view of the process of the meeting between a plurality of trucks on a road section where the meeting is possible.

As shown in FIG. 6, after the first mining truck 141 and the second mining truck 142 enter the auxiliary lane from the trunk lane (as shown in Figs. a and b of FIG. 6), if the meeting is also required between a third mining truck 143 and the second mining truck 142 on the trunk lane, the second mining truck 142 stops, and the third mining truck 143 applies to the traffic control server for a travelling permission request to switch from the trunk lane 210 to the auxiliary lane. After the request is approved, the route planning server will plan a fifth transition route 425 from the trunk lane 210 to the first auxiliary lane 221 for the third mining truck 143, and the third mining truck 143 enters the auxiliary lane from the trunk lane according to the fifth transition route 425. At this time, the second mining truck 142 and the third mining truck 143 travel slowly along the auxiliary lane (as shown in Fig. d of FIG. 6) until the meeting ends. The second mining truck 142 and the third mining truck 143 then apply to the traffic control server for a travelling permission request from the auxiliary lane to the trunk lane. After the request is approved, the route planning server will plan the transition routes from the auxiliary lanes to the trunk lane for the second mining truck 142 and the third mining truck 143 (as shown in Fig. e of FIG. 6). The second mining truck 142 and the third mining truck 143 enter the trunk lane from the auxiliary lanes and travel at a high speed (as shown in Fig. f of FIG. 6).

In the above embodiment, the traffic control server 130 is further configured to, after the first mining truck 141 enters the first auxiliary lane 221 from the trunk lane 210 according to the first transition route 421 and the second mining truck 142 enters the second auxiliary lane 222 from the trunk lane 210 according to the second transition route 422, if there is a third mining truck 143 traveling opposite to the second mining truck 142 and a second distance between the third mining truck 143 and the second mining truck 142 is less than or equal to the safety threshold $D_0$, send a command to the second mining truck 142 to stop and wait on the second auxiliary lane 222, and approve the travelling permission request from the third mining truck 143 to enter the first auxiliary lane 221. At this time, the first mining truck 141 leaves the first auxiliary lane 221.

The route planning server 120 is further configured to plan a fifth transition route 425 from the trunk lane 210 to the first auxiliary lane 221 for the third mining truck 143, and plan a sixth transition route 426 from the first auxiliary lane 221 to the trunk lane 210 for the third mining truck 143 after the third mining truck 143 and the second mining truck 142 perform the meeting.

In this embodiment, the meeting operation of a plurality of mining trucks on a dual lane is achieved, so that the efficiency of the meeting between two trucks can be improved.

Figure 7:
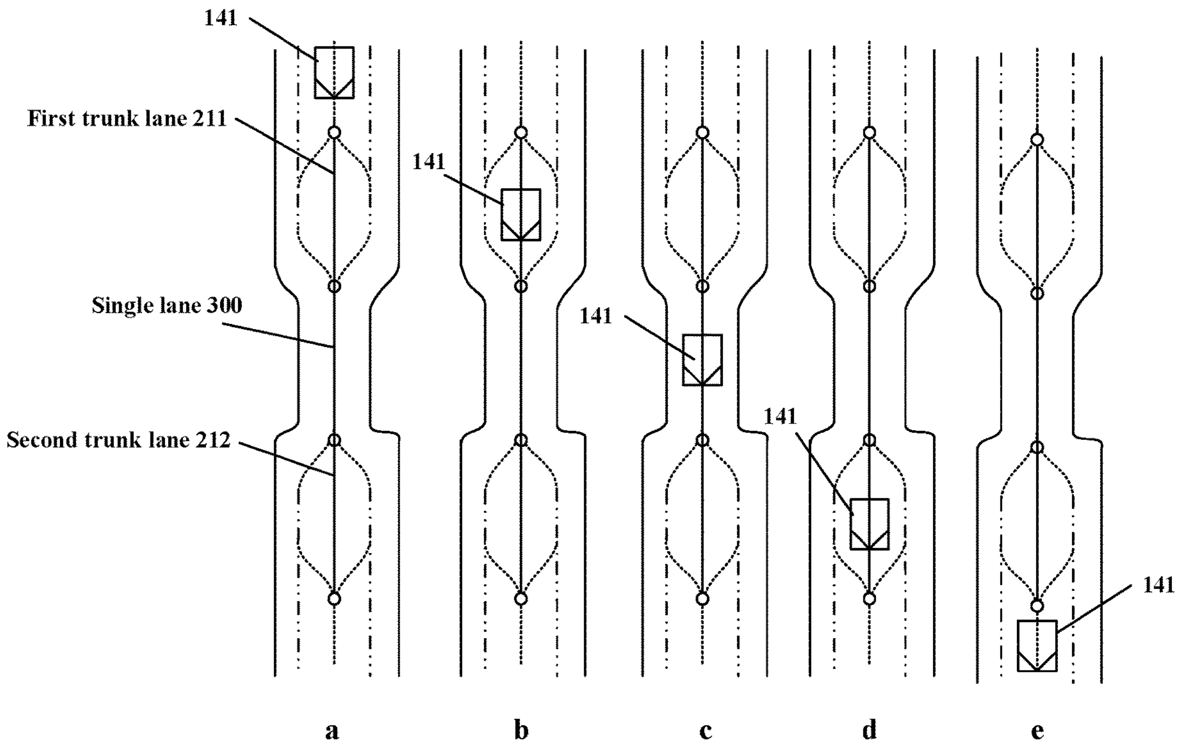
FIG. 7 is a schematic view showing a mining truck traveling on a mine road according to other embodiments of the present disclosure.

FIG. 7 is a schematic view showing a mining truck traveling on a mine road according to other embodiments of the present disclosure. FIG. 7 shows a schematic view of normal travel of the mining truck on the single road section of the mine.

As shown in FIG. 7, if the first mining truck 141 encounters the single lane 300 when traveling on the first trunk lane 211 at a high speed, there is a need to apply to the traffic control server for a travelling permission request in advance, and the request will be approved only when there are no vehicles traveling on the first trunk lane 211, the single lane 300 and the second trunk lane 212. After the request of the first mining truck 141 is approved, the first mining truck 141 may continue to slow down along the trunk lane. When almost reaching the second trunk lane 212, the first mining truck 141 sends a travelling permission request to enter the second trunk lane 212, as shown in Figs. c and d of FIG. 7. After the request is approved, the first mining truck 141 continues to slow down along the trunk lane, and travels normally at a high speed after leaving the second trunk lane 212.

In the above embodiment, the traffic control server 130 is further configured to approve the travelling permission request from the first mining truck 141 to enter the single lane 300 if there are no other mining trucks traveling on the single lane 300 in a case where the first mining truck 141 travels on a first trunk lane 211 adjacent to the single lane 300.

In this embodiment, the travel operation of the mining truck on the single lane is achieved.

Figure 8:
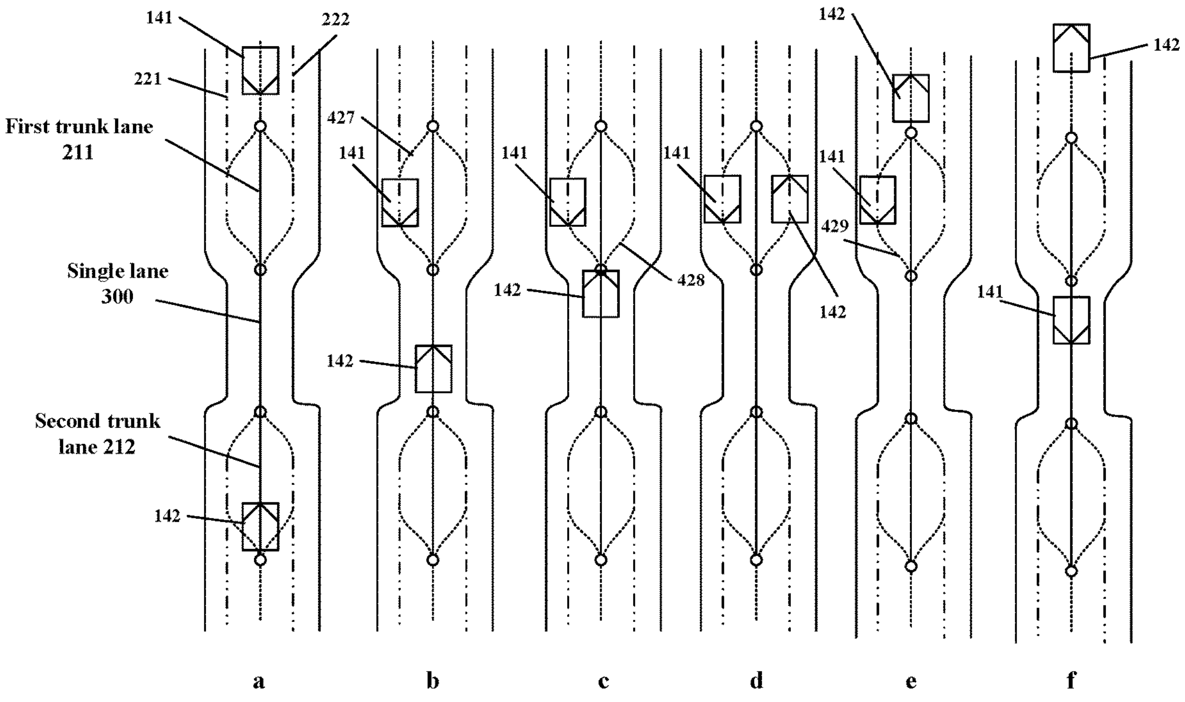
FIG. 8 is a schematic view showing a mining truck traveling on a mine road according to other embodiments of the present disclosure.

FIG. 8 is a schematic view showing a mining truck traveling on a mine road according to other embodiments of the present disclosure. FIG. 8 shows a schematic view of the process of the meeting between two mining trucks on a single lane.

As shown in FIG. 8, the first mining truck 141 encounters the single lane 300 when traveling on the first trunk lane 211 at a high speed. If the second mining truck 142 already travels on the second trunk lane 212, and the second mining truck 142 obtains the travel permission for the single lane 300 first, the single lane is in an occupied state, and the travelling permission request applied by the first mining truck 141 is refused. The first mining truck 141 may enter the first auxiliary lane 141 via the seventh transition route 427 connecting to the trunk lane and stop to wait (as shown in Fig. b of FIG. 8), and continuously request whether there is a travel permission for the single road section. At the same time, the first trunk lane 211 corresponding to the auxiliary lane where the first mining truck 141 is located is set to be an occupied state.

When the second mining truck 142 is about to reach the first trunk lane 211, the second mining truck 142 requests the traffic control server whether there is a travel permission for the first trunk lane 211, and it is refused at this time. The second mining truck 142 requests the traffic control server again whether there is a travel permission for the second auxiliary lane 222 corresponding to the first trunk lane 211. After the request is approved, the second mining truck 142 enters the second auxiliary lane 222, stops after entering the second auxiliary lane 222 (as shown Figs. c and d of FIG. 8), and continuously requests the traffic control server whether there is a travel permission for the trunk lane. If the travel permission is approved, the second mining truck 142 travels to the trunk lane via the second auxiliary lane and travels at a high speed (as shown in Figs. e and f of FIG. 8). After the second mining truck 142 leaves the single road section, the travel permission for the single road section is released so that the state of the single road section returns to be idle.

At this time, the request applied by the first mining truck 141 for a travel permission from the first auxiliary lane to the single lane is approved by the traffic control server, and the first mining truck 141 enters the single lane 300 via the first auxiliary lane 141 and continues to travel (as shown in Fig. f of FIG. 8).

In the above embodiment, the traffic control server 130 is further configured to refuse the travelling permission request from the first mining truck 141 to enter the single lane if the second mining truck 142 travels on the single lane 300 and the second mining truck 142 travels opposite to the first mining truck 141, and approve the travelling permission request from the second mining truck 142 to enter the second auxiliary lane 222 in a case where the second mining truck 142 travels to the first trunk lane, and approve the travelling permission request from the first mining truck 141 to enter the single lane 300 after the second mining truck leaves the second auxiliary lane and travels to the trunk lane.

The route planning server 120 is further configured to plan a seventh transition route 427 from the first trunk lane 211 to the first auxiliary lane 221 for the first mining truck 141 after the traffic control server 130 refuses the travelling permission request from the first mining truck 141 to enter the single lane 300, and plan an eighth transition route 428 from the first trunk lane 211 to the second auxiliary lane 222 for the second mining truck 142 after the traffic control server 130 approves the travelling permission request from the second mining truck 142 to enter the second auxiliary lane 222.

The route planning server 120 is further configured to plan the ninth transition route 429 from the first auxiliary lane 221 to the single lane 300 for the first mining truck 141 after the traffic control server 130 approves the travelling permission request from the first auxiliary lane to the single lane sent by the first mining truck 141.

In this embodiment, the process of the meeting between two mining trucks on a single lane is achieved, so that the efficiency of the meeting between two trucks can be improved.

By way of the above steps and situation rules, it is possible to solve the problems of narrow mine roads, impossible travel on most road sections at a high speed, low efficiency of the meeting between two vehicles and unsafe travel as much as possible, and implement that the mining trucks may travel on narrow roads safely at a high speed, the length of the single road is lessened at a maximum possibility, the time for stopping to wait is reduced and the meeting process may be performed safely.

Figure 9:
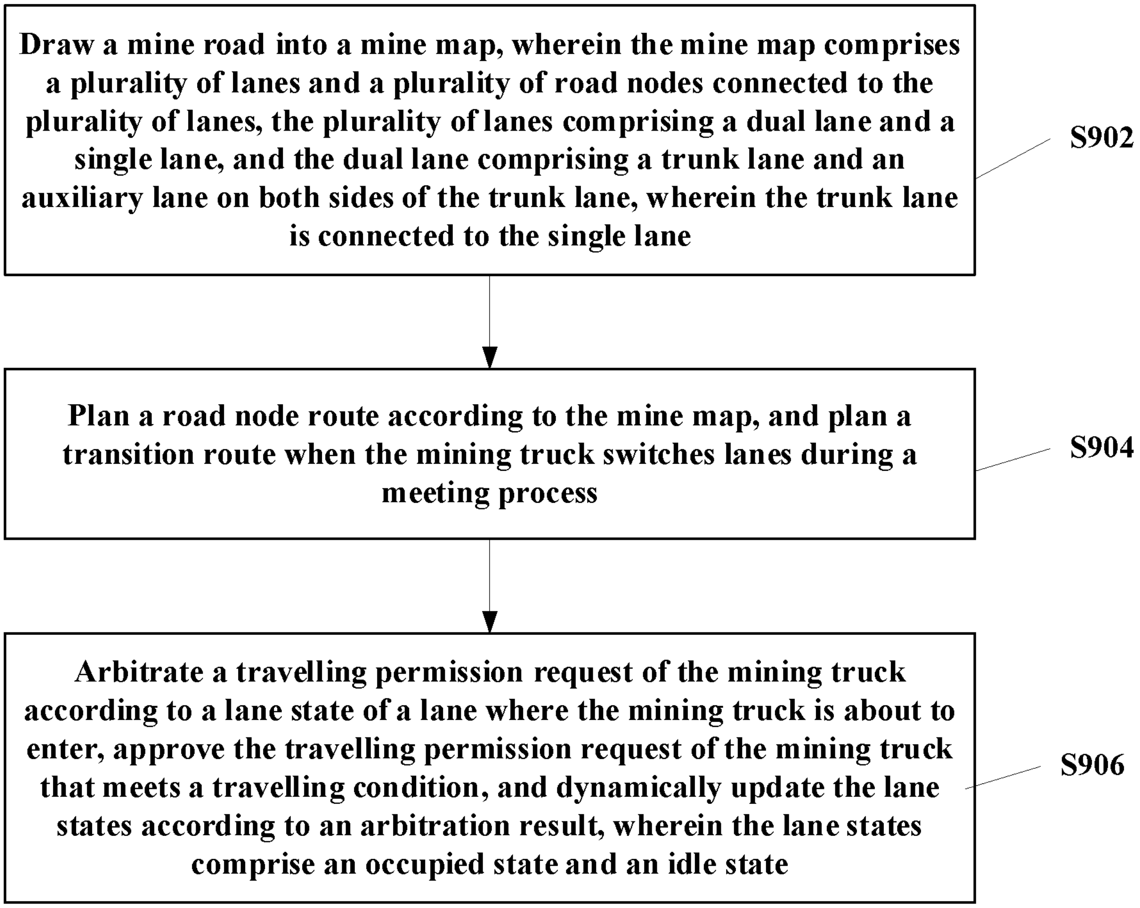
FIG. 9 is a flowchart showing a traffic control method for a mining truck according to some embodiments of the present disclosure.

FIG. 9 is a flowchart showing a traffic control method for a mining truck according to some embodiments of the present disclosure. As shown in FIG. 9, the method comprises steps S902 to S906.

In step S902, a mine road is drawn into a mine map, wherein the mine map comprises a plurality of lanes and a plurality of road nodes connected to the plurality of lanes, the plurality of lanes comprising a dual lane and a single lane, and the dual lane comprising a trunk lane and an auxiliary lane on both sides of the trunk lane, wherein the trunk lane is connected to the single lane.

In some embodiments, the step S902 comprises: for a first road section where a width of the mine road satisfies a condition for two mining trucks to meet, drawing a midline area of the mine road into the trunk lane and drawing a first auxiliary lane and a second auxiliary lane on both sides of the trunk lane by a map drawing tool, and drawing a transition route for connecting the auxiliary lane with the trunk lane, and setting, for a second road section where the width of the mine road does not satisfy the condition for two mining trucks to meet, the second road section as the single lane.

For example, the map management server draws the topological map of the entire mine road network and other necessary map information to form a complete mine map and store it in the database, wherein the road network contains information of each lane and an road node connecting to each lane. The midline of the mine road may be drawn to be a lane where the mining truck may travel, as the trunk lane for the mining truck to travel autonomously. For the road section where the width of the mine road is enough to allow the meeting between two vehicles, the auxiliary lanes are drawn on both sides of the trunk lane by a map drawing tool. It is ensured that the center distance between two auxiliary lanes satisfies the requirements of the meeting between two vehicles, and a distance between the auxiliary lane and the road boundary satisfies the requirement of safe distance for the vehicle to travel. For the road section where the width of the mine road cannot allows the meeting between two vehicles, the road section is set to be a single lane. Moreover, four transition lanes are drawn to connect the auxiliary lanes on both sides to the trunk lane. The data of the drawn lane map is saved to the map management server, and the map management server sends the lane data of the mine map to the traffic control server and the route planning server.

In step S904, a road node route is planned according to the mine map, and a transition route when the mining truck switches lanes during a meeting process is planned.

In step S906, a travelling permission request of the mining truck is arbitrated according to a lane state of a lane where the mining truck is about to enter, the travelling permission request of the mining truck that meets a travelling condition is approved, and the lane states are dynamically updated according to an arbitration result, wherein the lane states comprise an occupied state and an idle state.

So far, a traffic control method for a mining truck according to some embodiments of the present disclosure is provided. This method may improve the efficiency of the meeting between the mining trucks on the mine roads, thereby increasing the average speed of the vehicle on the road and further improving the transport efficiency of the system.

In some embodiments, the above-described traffic control method may further comprise: determining whether to approve the travelling permission request from a first mining truck to enter a next lane according to the lane state of the next lane where the first mining truck is about to enter and a first distance between the first mining truck and a second mining truck, wherein the second mining truck travels opposite to the first mining truck, approving the travelling permission request of the first mining truck to enter the next lane in a case where the lane state of the next lane is the idle state or in a case where the lane state of the next lane is the occupied state and the first distance is greater than a safety threshold, and refusing the travelling permission request of the first mining truck to enter the next lane and sending a deceleration command or a stopping command to the first mining truck and the second mining truck in a case where the lane state of the next lane is the occupied state and the first distance is less than or equal to the safety threshold.

In some embodiments, the above-described traffic control method may further comprise: according to a current position of the first mining truck and a current position of the second mining truck, planning a first travel trajectory for the first mining truck and planning a second travel trajectory for the second mining truck by using the mine map, and sending the first travel trajectory to the first mining truck and sending the second travel trajectory to the second mining truck, to cause the first mining truck and the second mining truck to perform meeting.

In some embodiments, the above-described traffic control method may further comprise: determining whether to approve the travelling permission request of the first mining truck to enter the auxiliary lane of the first road section according to the lane state of the auxiliary lane of the first road section after receiving the travelling permission request from the first mining truck to enter the auxiliary lane of the first road section; refusing the travelling permission request of the first mining truck to enter the auxiliary lane of the first road section and commanding the first mining truck to stop and wait in a case where the lane state of the auxiliary lane of the first road section is the occupied state; and approving the travelling permission request of the first mining truck to enter the auxiliary lane of the first road section in a case where the lane state of the auxiliary lane of the first road section is the idle state, planning a first transition route from the trunk lane of the first road section to the first auxiliary lane for the first mining truck, planning a second transition route from the trunk lane of the first road section to the second auxiliary lane for the second mining truck, and after the first mining truck and the second mining truck perform the meeting, planning a third transition route from the first auxiliary lane to the trunk lane for the first mining truck and planning a fourth transition route from the second auxiliary lane to the trunk lane for the second mining truck.

In some embodiments, the above-described traffic control method may further comprise: after the first mining truck enters the first auxiliary lane from the trunk lane according to the first transition route and the second mining truck enters the second auxiliary lane from the trunk lane according to the second transition route, if there is a third mining truck traveling opposite to the second mining truck and a second distance between the third mining truck and the second mining truck is less than or equal to the safety threshold, sending a command to the second mining truck to stop and wait on the second auxiliary lane, and approving the travelling permission request from the third mining truck to enter the first auxiliary lane, planning a fifth transition route from the trunk lane to the first auxiliary lane for the third mining truck, and planning a sixth transition route from the first auxiliary lane to the trunk lane for the third mining truck after the third mining truck and the second mining truck perform the meeting.

In some embodiments, the above-described traffic control method may further comprise: approving the travelling permission request from a first mining truck to enter the single lane if there are no other mining trucks traveling on the single lane in a case where the first mining truck travels on a first trunk lane adjacent to the single lane.

In some embodiments, the above-described traffic control method may further comprise: if a second mining truck travels on the single lane and the second mining truck travels opposite to the first mining truck, refusing the travelling permission request from the first mining truck to enter the single lane, and planning a seventh transition route from the first trunk lane to a first auxiliary lane for the first mining truck; in a case where the second mining truck travels to the first trunk lane, approving the travelling permission request from the second mining truck to enter a second auxiliary lane, and planning an eighth transition route from the first trunk lane to the second auxiliary lane for the second mining truck; and approving the travelling permission request from the first mining truck to enter the single lane after the second mining truck leaves the second auxiliary lane and travels to the trunk lane.

In the above-described method, the problem that the mining truck cannot travel autonomously safely at a high speed in the case where the width of the mine road is not enough to draw the standard dual lane is solved by managing the right-of-way and planning a local route. Every vehicle when traveling normally travels along the midline of the road at a high speed, and there is a safety distance wide enough between the vehicle and the edges on both sides of the road. Even if the travel trajectory of the vehicle deviates from the midline of the road, the vehicle control system also has enough space to address it, so as not to cause safety accidents. Traffic control may be carried out in two conditions during the meeting between two vehicles: (1) the width of the road section for the meeting allows the two vehicles to be subjected to the meeting at a low speed, so that the two vehicles travel to the auxiliary lane on the right side; and the travel road from the midline to the auxiliary lane is calculated in real time by route planning; (2) if the width of the road for the meeting is not enough for two vehicles to be subjected to the meeting, the road section will be provided to be a traffic control road section, and the two vehicles will travel to the auxiliary lane on the right side, and the vehicle with a lower priority will stop on the auxiliary lane to wait for the opposite vehicle with a higher priority to pass through the traffic control road section, and then travel to the midline of the road and continue to travel along the midline of the road at a high speed. The above method may achieve the following effects: (1) the mining truck may travel as safely as possible at a high speed on the mine roads; (2) the length of the single road is lessened and the time for stopping to wait is reduced at a maximum possibility; (3) safe the meeting process is achieved.

Figure 10:
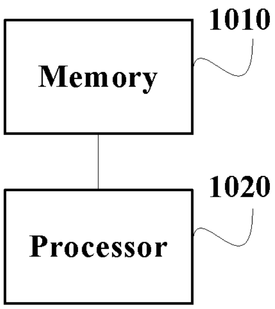
FIG. 10 is a structural schematic view showing a traffic control system for a mining truck according to other embodiments of the present disclosure.

FIG. 10 is a structural schematic view showing a traffic control system for a mining truck according to other embodiments of the present disclosure. The traffic control system comprises a memory 1010 and a processor 1020.

The memory 1010 may be a magnetic disk, a flash memory or any other nonvolatile storage medium. The memory is configured to store the instructions in the embodiment corresponding to FIG. 9.

The processor 1020 is coupled to the memory 1010, and may be implemented as one or more integrated circuits, for example a microprocessor or microcontroller. The processor 1020 is configured to execute the instructions stored in the memory, so that the efficiency of the meeting between the mining trucks on the mine roads can be improved, thereby increasing the average speed of the vehicle on the road and further improving the transport efficiency of the system.

Figure 11:
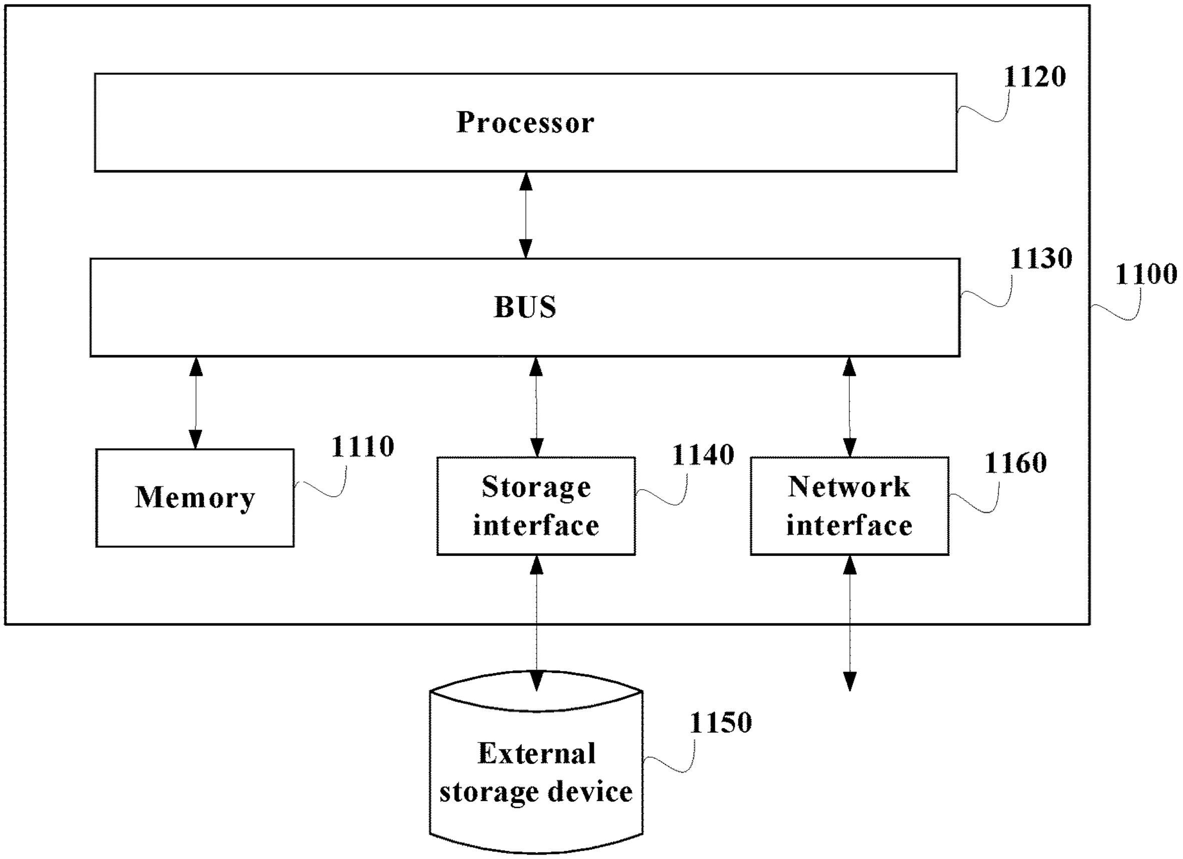
FIG. 11 is a structural schematic view showing a traffic control system for a mining truck according to other embodiments of the present disclosure.

In some embodiments, as shown in FIG. 11, the traffic control system 1100 comprises a memory 1110 and a processor 1120. The processor 1120 is coupled to the memory 1110 via the bus 1130. The traffic control system 1100 may also be connected to an external storage device 1150 via a storage interface 1140 to call external data, and may also be connected to a network or another computer system (not shown) via a network interface 1160, which will not be introduced in detail here.

In this embodiment, it is possible to improve the efficiency of the meeting between the mining trucks on the mine roads by storing data instructions by the memory and then processing the above-described instructions by the processor, thereby increasing the average speed of the vehicle on the road and further improving the transport efficiency of the system.

In another embodiment, the present disclosure also provides a computer-readable storage medium having stored thereon computer program instructions that, when executed by a processor, implement the steps of the method in the embodiments corresponding to FIG. 9. Those skilled in the art will appreciate that the embodiments of the present disclosure may be provided as a method, device, or computer program product. Accordingly, the present disclosure may take the form of an entirely hardware embodiment, an entirely software embodiment, or a combination of software and hardware aspects. Moreover, the present disclosure may take the form of a computer program product implemented on one or more computer-usable non-transitory storage media (comprising but not limited to disk memory, CD-ROM, optical memory, or the like) containing computer usable program codes therein.

The present disclosure is described in conjunction with the flow charts and/or block diagrams of the methods, devices (systems), and computer program products according to the embodiments of the present disclosure. It will be understood that each step and/or block of the flow charts and/or block diagrams as well as a combination of steps and/or blocks of the flow charts and/or block diagrams may be implemented by a computer program instruction. These computer program instructions may be provided to a processor of a general purpose computer, special purpose computer, an embedded processing machine, or other programmable data processing devices to produce a machine, such that the instructions executed by a processor of a computer or other programmable data processing devices produce a device for realizing a function designated in one or more steps of a flow chart and/or one or more blocks in a block view.

These computer program instructions may also be stored in a computer readable memory that may guide a computer or other programmable data processing device to operate in a particular manner, such that the instructions stored in the computer readable memory produce a manufacture comprising an instruction device. The instruction device realizes a function designated in one or more steps in a flow chart or one or more blocks in a block view.

These computer program instructions may also be loaded onto a computer or other programmable data processing devices, such that a series of operational steps are performed on a computer or other programmable device to produce a computer-implemented processing, such that the instructions executed on a computer or other programmable devices provide steps for realizing a function designated in one or more steps of the flow chart and/or one or more blocks in the block view.

Hitherto, the present disclosure has been described in detail. Some details well known in the art are not described in order to avoid obscuring the concept of the present disclosure. According to the above description, those skilled in the art would fully understand how to implement the technical solutions disclosed here.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments may be made without departing from the scope and spirit of the present disclosure. The scope of the present disclosure is defined by the appended claims.

What is claimed is:

1. A traffic control system for a mining truck, comprising:

a map management server configured to draw a mine road into a mine map, wherein the mine map comprises a plurality of lanes and a plurality of road nodes connected to the plurality of lanes, the plurality of lanes comprising a dual lane and a single lane, and the dual lane comprising a trunk lane and an auxiliary lane on both sides of the trunk lane, wherein the trunk lane is connected to the single lane;

a route planning server configured to obtain the mine map from the map management server, plan a road node route according to the mine map, and plan a transition route when the mining truck switches lanes during a meeting process; and a traffic control server configured to store lane states of the plurality of lanes in the mine map, arbitrate a travelling permission request of the mining truck according to a lane state of a lane where the mining truck is about to enter, approve the travelling permission request of the mining truck that meets a travelling condition, and dynamically update the lane states according to an arbitration result, wherein the lane states comprise an occupied state and an idle state, the idle state is a state of the lane where there is no vehicle traveling in the lane, and the occupied state is a state of the lane where there is a vehicle traveling in the lane;

wherein the map management server is configured to, for a first road section where a width of the mine road satisfies a condition for two mining trucks to meet, draw a midline area of the mine road into the trunk lane and draw a first auxiliary lane and a second auxiliary lane on both sides of the trunk lane by a map drawing tool, and set, for a second road section where the width of the mine road does not satisfy the condition for two mining trucks to meet, the second road section as the single lane;

the route planning server is configured to, according to a current position of a first mining truck of the two mining trucks and a current position of a second mining truck of the two mining trucks traveling opposite to the first mining truck, plan a first travel trajectory for the first mining truck and plan a second travel trajectory for the second mining truck by using the mine map, and send the first travel trajectory to the first mining truck and send the second travel trajectory to the second mining truck, to cause the first mining truck and the second mining truck to perform meeting; and the traffic control server is configured to determine whether to approve the travelling permission request from the first mining truck to enter a next lane according to the lane state of the next lane where the first mining truck is about to enter and a first distance between the first mining truck and the second mining truck, approve the travelling permission request of the first mining truck to enter the next lane in a case where the lane state of the next lane is the idle state or in a case where the lane state of the next lane is the occupied state and the first distance is greater than a safety threshold, and refuse the travelling permission request of the first mining truck to enter the next lane and send a deceleration command or a stopping command to the first mining truck and the second mining truck in a case where the lane state of the next lane is the occupied state and the first distance is less than or equal to the safety threshold.

2. The traffic control system according to claim 1, wherein the traffic control server is further configured to determine whether to approve the travelling permission request of the first mining truck to enter the auxiliary lane of the first road section according to the lane state of the auxiliary lane of the first road section after receiving the travelling permission request from the first mining truck to enter the auxiliary lane of the first road section, refuse the travelling permission request of the first mining truck to enter the auxiliary lane of the first road section and command the first mining truck to stop and wait in a case where the lane state of the auxiliary lane of the first road section is the occupied state, and approve the travelling permission request of the first mining truck to enter the auxiliary lane of the first road section in a case where the lane state of the auxiliary lane of the first road section is the idle state.

3. The traffic control system according to claim 2, wherein the route planning server is further configured to, in a case where the traffic control server approves the travelling permission request of the first mining truck to enter the auxiliary lane of the first road section, plan a first transition route from the trunk lane of the first road section to the first auxiliary lane for the first mining truck, plan a second transition route from the trunk lane of the first road section to the second auxiliary lane for the second mining truck, and after the first mining truck and the second mining truck perform the meeting, plan a third transition route from the first auxiliary lane to the trunk lane for the first mining truck and plan a fourth transition route from the second auxiliary lane to the trunk lane for the second mining truck.

4. The traffic control system according to claim 3, wherein:

the traffic control server is further configured to, after the first mining truck enters the first auxiliary lane from the trunk lane according to the first transition route and the second mining truck enters the second auxiliary lane from the trunk lane according to the second transition route, if there is a third mining truck traveling opposite to the second mining truck and a second distance between the third mining truck and the second mining truck is less than or equal to the safety threshold, send a command to the second mining truck to stop and wait on the second auxiliary lane, and approve the travelling permission request from the third mining truck to enter the first auxiliary lane; and the route planning server is further configured to plan a fifth transition route from the trunk lane to the first auxiliary lane for the third mining truck, and plan a sixth transition route from the first auxiliary lane to the trunk lane for the third mining truck after the third mining truck and the second mining truck perform the meeting.

5. The traffic control system according to claim 1, wherein the traffic control server is further configured to approve the travelling permission request from a first mining truck of the two mining trucks to enter the single lane if there are no other mining trucks traveling on the single lane in a case where the first mining truck travels on a first trunk lane adjacent to the single lane.

6. The traffic control system according to claim 5, wherein:

the traffic control server is further configured to refuse the travelling permission request from the first mining truck to enter the single lane if the second mining truck travels on the single lane and the second mining truck travels opposite to the first mining truck, and approve the travelling permission request from the second mining truck to enter the second auxiliary lane in a case where the second mining truck travels to the first trunk lane, and approve the travelling permission request from the first mining truck to enter the single lane after the second mining truck leaves the second auxiliary lane and travels to the trunk lane; and the route planning server is further configured to plan a seventh transition route from the first trunk lane to the first auxiliary lane for the first mining truck after the traffic control server refuses the travelling permission request from the first mining truck to enter the single lane, and plan an eighth transition route from the first trunk lane to the second auxiliary lane for the second mining truck after the traffic control server approves the travelling permission request from the second mining truck to enter the second auxiliary lane.

7. A traffic control method for a mining truck, comprising:

drawing a mine road into a mine map, wherein the mine map comprises a plurality of lanes and a plurality of road nodes connected to the plurality of lanes, the plurality of lanes comprising a dual lane and a single lane, and the dual lane comprising a trunk lane and an auxiliary lane on both sides of the trunk lane, wherein the trunk lane is connected to the single lane;

planning a road node route according to the mine map, and planning a transition route when the mining truck switches lanes during a meeting process; and arbitrating a travelling permission request of the mining truck according to a lane state of a lane where the mining truck is about to enter, approving the travelling permission request of the mining truck that meets a travelling condition, and dynamically updating the lane states according to an arbitration result, wherein the lane states comprise an occupied state and an idle state, the idle state is a state of the lane where there is no vehicle traveling in the lane, and the occupied state is a state of the lane where there is a vehicle traveling in the lane;

wherein the drawing of the mine road into the mine map comprises: for a first road section where a width of the mine road satisfies a condition for two mining trucks to meet, drawing a midline area of the mine road into the trunk lane and drawing a first auxiliary lane and a second auxiliary lane on both sides of the trunk lane by a map drawing tool, and setting, for a second road section where the width of the mine road does not satisfy the condition for two mining trucks to meet, the second road section as the single lane; and the traffic control method further comprises:

determining whether to approve the travelling permission request from a first mining truck to enter a next lane according to the lane state of the next lane where the first mining truck is about to enter and a first distance between the first mining truck and a second mining truck, wherein the second mining truck travels opposite to the first mining truck, approving the travelling permission request of the first mining truck to enter the next lane in a case where the lane state of the next lane is the idle state or in a case where the lane state of the next lane is the occupied state and the first distance is greater than a safety threshold, and refusing the travelling permission request of the first mining truck to enter the next lane and sending a deceleration command or a stopping command to the first mining truck and the second mining truck in a case where the lane state of the next lane is the occupied state and the first distance is less than or equal to the safety threshold; and according to a current position of the first mining truck and a current position of the second mining truck, planning a first travel trajectory for the first mining truck and planning a second travel trajectory for the second mining truck by using the mine map, and sending the first travel trajectory to the first mining truck and sending the second travel trajectory to the second mining truck, to cause the first mining truck and the second mining truck to perform meeting.

8. The traffic control method according to claim 7, further comprising:

determining whether to approve the travelling permission request of the first mining truck to enter the auxiliary lane of the first road section according to the lane state of the auxiliary lane of the first road section after receiving the travelling permission request from the first mining truck to enter the auxiliary lane of the first road section;

refusing the travelling permission request of the first mining truck to enter the auxiliary lane of the first road section and commanding the first mining truck to stop and wait in a case where the lane state of the auxiliary lane of the first road section is the occupied state; and approving the travelling permission request of the first mining truck to enter the auxiliary lane of the first road section in a case where the lane state of the auxiliary lane of the first road section is the idle state, planning a first transition route from the trunk lane of the first road section to the first auxiliary lane for the first mining truck, planning a second transition route from the trunk lane of the first road section to the second auxiliary lane for the second mining truck, and after the first mining truck and the second mining truck perform the meeting, planning a third transition route from the first auxiliary lane to the trunk lane for the first mining truck and planning a fourth transition route from the second auxiliary lane to the trunk lane for the second mining truck.

9. The traffic control method according to claim 8, further comprising:

after the first mining truck enters the first auxiliary lane from the trunk lane according to the first transition route and the second mining truck enters the second auxiliary lane from the trunk lane according to the second transition route, if there is a third mining truck traveling opposite to the second mining truck and a second distance between the third mining truck and the second mining truck is less than or equal to the safety threshold, sending a command to the second mining truck to stop and wait on the second auxiliary lane, and approving the travelling permission request from the third mining truck to enter the first auxiliary lane, planning a fifth transition route from the trunk lane to the first auxiliary lane for the third mining truck, and planning a sixth transition route from the first auxiliary lane to the trunk lane for the third mining truck after the third mining truck and the second mining truck perform the meeting.

10. The traffic control method according to claim 7, further comprising:

approving the travelling permission request from a first mining truck to enter the single lane if there are no other mining trucks traveling on the single lane in a case where the first mining truck travels on a first trunk lane adjacent to the single lane.

11. The traffic control method according to claim 10, further comprising:

if a second mining truck travels on the single lane and the second mining truck travels opposite to the first mining truck, refusing the travelling permission request from the first mining truck to enter the single lane, and planning a seventh transition route from the first trunk lane to a first auxiliary lane for the first mining truck;

in a case where the second mining truck travels to the first trunk lane, approving the travelling permission request from the second mining truck to enter a second auxiliary lane, and planning an eighth transition route from the first trunk lane to the second auxiliary lane for the second mining truck; and approving the travelling permission request from the first mining truck to enter the single lane after the second mining truck leaves the second auxiliary lane and travels to the trunk lane.

12. A traffic control system for a mining truck, comprising:

a memory; and a processor coupled to the memory, wherein the processor is configured to, based on instructions stored in the memory:

draw a mine road into a mine map, wherein the mine map comprises a plurality of lanes and a plurality of road nodes connected to the plurality of lanes, the plurality of lanes comprising a dual lane and a single lane, and the dual lane comprising a trunk lane and an auxiliary lane on both sides of the trunk lane, wherein the trunk lane is connected to the single lane;

plan a road node route according to the mine map, and plan a transition route when the mining truck switches lanes during a meeting process; and arbitrate a travelling permission request of the mining truck according to a lane state of a lane where the mining truck is about to enter, approve the travelling permission request of the mining truck that meets a travelling condition, and dynamically update the lane states according to an arbitration result, wherein the lane states comprise an occupied state and an idle state, the idle state is a state of the lane where there is no vehicle traveling in the lane, and the occupied state is a state of the lane where there is a vehicle traveling in the lane, wherein the processor is configured to: for a first road section where a width of the mine road satisfies a condition for two mining trucks to meet, draw a midline area of the mine road into the trunk lane and draw a first auxiliary lane and a second auxiliary lane on both sides of the trunk lane by a map drawing tool, and set, for a second road section where the width of the mine road does not satisfy the condition for two mining trucks to meet, the second road section as the single lane; and the processor is further configured to:

determine whether to approve the travelling permission request from a first mining truck to enter a next lane according to the lane state of the next lane where the first mining truck is about to enter and a first distance between the first mining truck and a second mining truck, wherein the second mining truck travels opposite to the first mining truck, approve the travelling permission request of the first mining truck to enter the next lane in a case where the lane state of the next lane is the idle state or in a case where the lane state of the next lane is the occupied state and the first distance is greater than a safety threshold, and refuse the travelling permission request of the first mining truck to enter the next lane and send a deceleration command or a stopping command to the first mining truck and the second mining truck in a case where the lane state of the next lane is the occupied state and the first distance is less than or equal to the safety threshold; and according to a current position of the first mining truck and a current position of the second mining truck, plan a first travel trajectory for the first mining truck and plan a second travel trajectory for the second mining truck by using the mine map, and send the first travel trajectory to the first mining truck and send the second travel trajectory to the second mining truck, to cause the first mining truck and the second mining truck to perform meeting.

13. The traffic control system for a mining truck according to claim 12, wherein the processor is further configured to:

determine whether to approve the travelling permission request of the first mining truck to enter the auxiliary lane of the first road section according to the lane state of the auxiliary lane of the first road section after receiving the travelling permission request from the first mining truck to enter the auxiliary lane of the first road section;

refuse the travelling permission request of the first mining truck to enter the auxiliary lane of the first road section and command the first mining truck to stop and wait in a case where the lane state of the auxiliary lane of the first road section is the occupied state; and approve the travelling permission request of the first mining truck to enter the auxiliary lane of the first road section in a case where the lane state of the auxiliary lane of the first road section is the idle state, plan a first transition route from the trunk lane of the first road section to the first auxiliary lane for the first mining truck, plan a second transition route from the trunk lane of the first road section to the second auxiliary lane for the second mining truck, and after the first mining truck and the second mining truck perform the meeting, plan a third transition route from the first auxiliary lane to the trunk lane for the first mining truck and plan a fourth transition route from the second auxiliary lane to the trunk lane for the second mining truck.

* * * * *